(12) United States Patent
Oima et al.

(10) Patent No.: US 6,597,423 B1
(45) Date of Patent: Jul. 22, 2003

(54) LIQUID CRYSTAL DISPLAY DEVICE HAVING ELECTRIC FIELD IN AREAS WITH A CONTROL WINDOW FORMED THEREON

(75) Inventors: Susumu Oima, Gifu-ken (JP); Ryuji Nishikawa, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/524,778

(22) Filed: Mar. 14, 2000

(30) Foreign Application Priority Data

Mar. 15, 1999 (JP) .......................................... 11-068711

(51) Int. Cl.[7] ...................... G02F 1/1337; G02F 1/1343
(52) U.S. Cl. ...................... 349/139; 349/129; 349/130; 349/143; 349/144
(58) Field of Search .................. 349/139, 143, 349/144, 129, 130

(56) References Cited

U.S. PATENT DOCUMENTS

| | | | |
|---|---|---|---|
| 5,309,264 A | 5/1994 | Lien et al. | |
| 5,608,556 A | 3/1997 | Koma | |
| 5,666,179 A | 9/1997 | Koma | |
| 5,710,611 A | 1/1998 | Suzuki et al. | |
| 5,907,380 A | 5/1999 | Lien | |
| 5,936,693 A * | 8/1999 | Yoshida et al. | 349/139 |
| 6,081,315 A * | 6/2000 | Matsuyama et al. | 349/143 |
| 6,097,466 A | 8/2000 | Koma | 349/143 |
| 6,157,428 A | 12/2000 | Koma | 349/138 |
| 6,256,082 B1 * | 7/2001 | Suzuki et al. | 349/144 |
| 6,278,503 B1 | 8/2001 | Nishikawa et al. | 349/39 |
| 6,313,899 B1 * | 11/2001 | Wu et al. | 349/130 |
| 6,327,013 B1 * | 12/2001 | Tombling et al. | |
| 6,362,864 B2 | 3/2002 | Koma et al. | 349/138 |
| 6,369,870 B1 | 4/2002 | Koma | 349/130 |
| 6,456,352 B1 | 9/2002 | Matsuyama et al. | 349/143 |

FOREIGN PATENT DOCUMENTS

| | | |
|---|---|---|
| JP | 2-234127 | 9/1990 |
| JP | 7-311383 | 11/1995 |
| JP | 9-043610 | 2/1997 |
| JP | 11-109393 | 4/1999 |

* cited by examiner

Primary Examiner—Julie Ngo
(74) Attorney, Agent, or Firm—Hogan & Hartson, LLP

(57) ABSTRACT

A pixel electrode (55) and a common electrode (63) having alignment control windows (65) formed thereon, are formed on opposing substrates (50, 60). Alignment control assistance electrodes (1) are formed between the substrate (60) and a color filter (61) in areas covering the alignment control windows (65), and supplied with a voltage of a different polarity from that to be applied to the opposing pixel electrodes. With this arrangement, an electric field is formed in areas with the alignment control window formed thereon, whereby an alignment direction of the liquid crystal molecules is more strongly controlled.

22 Claims, 7 Drawing Sheets

LIQUID CRYSTAL DISPLAY DEVICE HAVING ELECTRIC FIELD IN AREAS WITH A CONTROL WINDOW FORMED THEREON

BACKGROUND OF THE INVENTION

1. Field of the Invention

The present invention relates to a liquid crystal display (LCD) and in particular to improvement of display quality of a vertically aligned LCD having an alignment control window.

2. Description of the Related Art

A vertically aligned LCD having an alignment control window is proposed, for example, in Japanese Patent Laid-open No. Hei 6-301036, in which alignment direction of liquid crystal is controlled. The vertically aligned LCD has liquid crystal having negative dielectric constant anisotropy and a vertically aligned film. In the following, an LCD of this type will be described.

FIG. 6A is a plan view showing an LCD having an alignment control window, and FIG. 6B is a cross sectional view of the LCD along the line A–A' in FIG. 6A. A gate line 51 is formed on a first substrate (TFT substrate) 50, and covered by a gate insulating film 52. On the insulating film 52 there is formed a thin film transistor (TFT) 53 comprising a polysilicon film. A part of the gate line 51 constitutes a gate electrode for the TFT 53. Covering the above, an interlayer insulating film 54 is formed, on which a pixel electrode 55, comprising indium tin oxide (ITO), is formed being connected to the TFT 53 via a contact hole formed on the interlayer insulating film 54. On the pixel electrode 55 there is formed a vertically aligned film 56, comprising an organic material, such as polyimide, or an inorganic material, such as silane material. The interlayer insulating film 54 consists of two layers, including an interlayer insulating film 54a having a data line 57 formed thereon. The data line 57, connected to a source region of the TFT 53, supplies charges to the pixel electrode 55 when the gate line 51 is turned on. Note that the data line 57 is formed below the pixel electrode 55 in order to prevent the liquid crystal from being caused to slant directly by the voltage applied to the data line 57.

A second substrate 60 is located as it is opposing the first substrate 50, having a color filter 61 formed thereon at a position corresponding to the pixel electrode 55. Further, a common electrode 63, comprising ITO or the like, is formed via the insulating film 62 on the second substrate 60, opposing the plurality of pixel electrodes 55. Similar to the first substrate 50 side, a vertically aligned film 64 is formed on the common electrode 63. The common electrode 63 has an alignment control window 65 formed thereon at a position corresponding to the pixel electrode 55. An alignment control window 65, or an opening on the common electrode in absence of an electrode, has a shape resembling, for example, a "Y" and a inverted "Y" connected together, specifically, having branching upper and lower ends.

Liquid crystal 70 is enclosed between the first and second substrates 50, 60. Direction, or alignment, of the liquid crystal molecules is controlled according to the strength of an electric field formed by the voltage applied to between the pixel electrode 55 and the common electrode 63. Polarizers (not shown) are respectively provided on the outside of the first and second substrates 50, 60, with the polarizing axes thereof being vertical. A straight polarization (light) proceeding from one polarizer to the other is modulated while passing through the liquid crystal 70, to thus achieve a desired transmittance, the liquid crystal 70 being controlled for every display pixel to have an alignment corresponding to the applied voltage to the pixel electrode.

The liquid crystal 70 has negative dielectric constant anisotropy, and slants, by nature, relative to the direction of an electric field. The liquid crystal 70 is controlled to have vertical initial alignment by vertically aligned films 56, 64. In this case, with no voltage applied, the liquid crystal molecules are aligned vertically with respect to the vertically aligned films 56, 64. Therefore, the straight polarization having gone through the polarization panel on one side, proceeds through the liquid crystal layer 70 to reach and be shielded by the polarization panel on the other side, as a result of which a black is display is shown. When a voltage is applied to between the pixel electrode 55 and the common electrode 63 in the above structure, electric fields 66, 67 are generated, whereby the liquid crystal molecules are caused to slant. In particular, around the edges of each pixel electrode 55, the caused electric field 66 is vertical directing from the pixel electrode 55 toward the common electrode 63. Similarly, around the edges of each alignment control window 65, the caused electric field 67 is vertical directing toward the pixel electrode 55 due to the absence of an electrode. As the liquid crystal molecules are controlled to be aligned vertically with respect to this vertical electric fields, the molecules are resultantly forced to slant directing toward the inner side of each pixel electrode 55, i.e., the alignment control window 65. As a result, the straight polarization having penetrated the polarizer on one side is subjected to birefringence in the liquid crystal layer 70 to be thereby converted into elliptically polarized light before passing through the polarizer on the other side. With the above, a nearly white color is displayed.

The pixel electrode 55 is supplied with a voltage via the TFT, when the gate line 51 and the data line 57 are both turned on to drive the liquid crystal immediately thereabove. Application of appropriate voltages to the respective pixel electrodes 55 could achieve LCD display. That is, an area with a pixel electrode 55 formed thereon constitutes a pixel.

In a part immediately below the alignment control window 65, an electric field is not caused despite voltage application due to the lack of common electrode 63, and liquid crystal molecules in that part therefore remain in the initial state, or fixed directing in a vertical direction. As a result of the above, liquid crystal molecules on both sides of the alignment control window 65 have opposite alignments due to continuity of liquid crystal, and this contributes to ensuring a wider viewing angle.

An LCD voltage application method will next be described.

FIG. 7 is a timing chart for voltages to be applied to the gate lines 51 and the data line 57, and for a voltage of a pixel electrode driven thereby. (a), (b), and (c) show voltages to be applied to the first gate line 51, the second gate line 51, and the data line 57, respectively, the second gate line 51 being positioned next to the first gate line 51. (d) and (e) show voltages of the pixel electrode 55 to be controlled by the first gate line 51 and the data line 57, and of the pixel electrode 55 to be controlled by the second gate line 51 and the data line 57.

A voltage is applied to the first gate line 51 during one horizontal synchronization period (hereinafter denoted as 1H), so that the gate line 51 is turned on to thereby turn on the TFTs 53 of the associated arrayed pixel electrode 55 on the first horizontal line. In addition, voltages corresponding to a display image are continuously applied to the respective data lines 57 during a period 1H, so that the arrayed pixel electrodes 55 with turned-on TFTs can retain their voltages. During the next period 1H, the first gate line 51 is turned off, while the second gate line 51 is turned on. Accordingly, the TFTs of the pixel electrodes 55 corresponding to the second gate line 52 are turned on, and the pixel electrodes 55 connected to the TFTs on the second horizontal line can retain their voltages supplied from the data line 57. Subsequently, a voltage is supplied to pixel electrodes 55 in each row for every period 1H to thereby drive associated liquid crystal for image display. Here, an electric field is caused in an opposite direction for every pixel electrode row in order to prevent deterioration of the liquid crystal. Specifically, arrayed pixel electrodes 55 subject to control by the first gate line 51 are supplied with a voltage $V_{high}$ (10V) higher than a potential Vc (e.g., 6V) of the common electrodes 63 by a predetermined potential (e.g., 4V), and the adjacent arrayed pixel electrodes 55 are supplied with an inverted voltage, or a voltage $V_{low}$ (e.g., 2V) lower than the potential Vc by a predetermined potential (e.g., 4V). Subsequently, the arrayed pixel electrodes 55 associated with the first gate line 51 are then supplied with a voltage inverted from that which was last supplied thereto, or a voltage $V_{low}$. The above voltage application method is referred to as a line inversion method. According to this line inversion method, in which voltages for application to pixel electrodes are inverted using the voltage Vc of the common electrode 63 as a middle voltage value, electric fields of identical formations but in opposite directions are formed for every pixel electrode array in a horizontal line. Note that a voltage is applied to each pixel electrode 55 every time the corresponding TFT is on in the above example. Whether or not to apply a voltage different from that of the common electrode 63 to each pixel electrode 55 is determined according to display data.

Generally, an LCD of the above described type, i.e., a vertically aligned LCD having an alignment control window, can attain only weak control over the alignment direction of liquid crystal molecules, compared to an LCD of a rubbing-type, in which the alignment direction is controlled through rubbing. Therefore, problems may occur, for example, in that inconsistent distribution of spacers for defining the thickness of the liquid crystal layer 70 may result in inconsistent thickness of the liquid crystal layer 70, and that the alignment direction of the liquid crystal molecules may be disturbed by any alignment disturbing factor, such as an electric field applied from the outside, (hereinafter referred to outside disturbance), causing the characteristics of a viewing angle of a pixel to change. Because of the continuity of the liquid crystal, disordered alignment in a part of liquid crystal may affect the alignment direction of the remaining liquid crystal in a pixel. A boundary may be caused anywhere (not fixed) between the disorderly aligned liquid crystal and the properly aligned liquid crystal, constituting a plane with discontinuous liquid crystal alignment, or disclination. This may lead to a drop of an aperture ratio as no light passes through an area with disclination. In addition, outside disturbance, which may disturb the liquid crystal alignment differently for every pixel, may also cause uneven screen display with deteriorated LCD display quality.

Still further, when a glass substrate is charged, for example, positive due to outside disturbance, an area opposite thereto will be charged opposite, or negative. Although the charging may have less effect on a common electrode as it receives a voltage, an alignment control window, in absence of an electrode and an applied voltage, remains charged. A charged alignment control window may cause an unintended electric field, which may affect the alignment direction of the liquid crystal molecules within the pixel. In a macro view, spots with different colors may be caused. Also, the charging itself may be outside disturbance.

SUMMARY OF THE INVENTION

The present invention aims to provide a vertically aligned LCD having an alignment control window, which can attain high display quality.

According to the present invention, there is provided a vertically aligned LCD having an alignment control window formed by making an opening on a common electrode which is formed on a second substrate at a position corresponding to a pixel electrode, in which an alignment control assistance electrode is provided between the common electrode and the second substrate. With this arrangement, liquid crystal alignment direction can be more strongly controlled to remain more stabilized and less vulnerable to outside disturbance, such as an outside electric field. This contributes to improvement of LCD display quality.

According to another aspect of the present invention, when a line inversion method is employed as a driving method, it is preferable that the alignment control assistance electrodes are supplied with a voltage when a voltage is applied to the arrayed pixel electrodes adjacent to the opposing pixel electrodes. With this arrangement, no specific control circuit is required in applying a voltage to the alignment control assistance electrode, the voltage being inverted from that to be applied to the associated pixel electrode.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

Figure 1A:
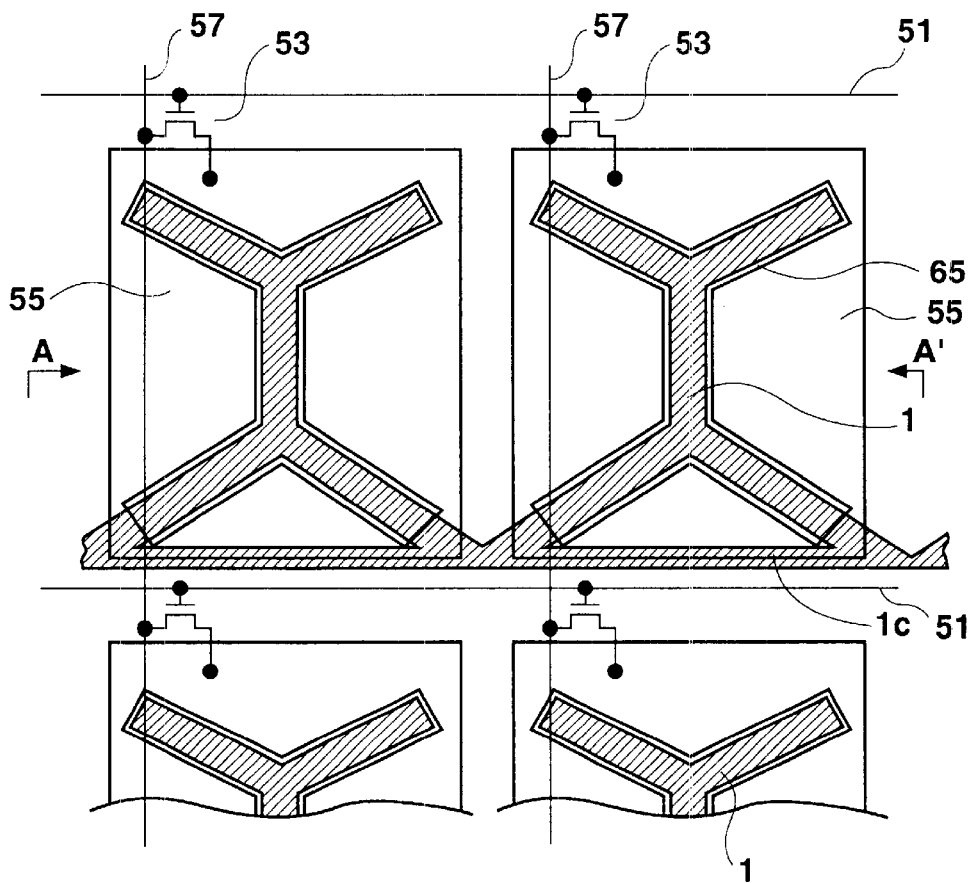
FIGS. 1A and 1B are respectively a plan view and a cross sectional view showing a preferred embodiment of the present invention.
Figure 1B:
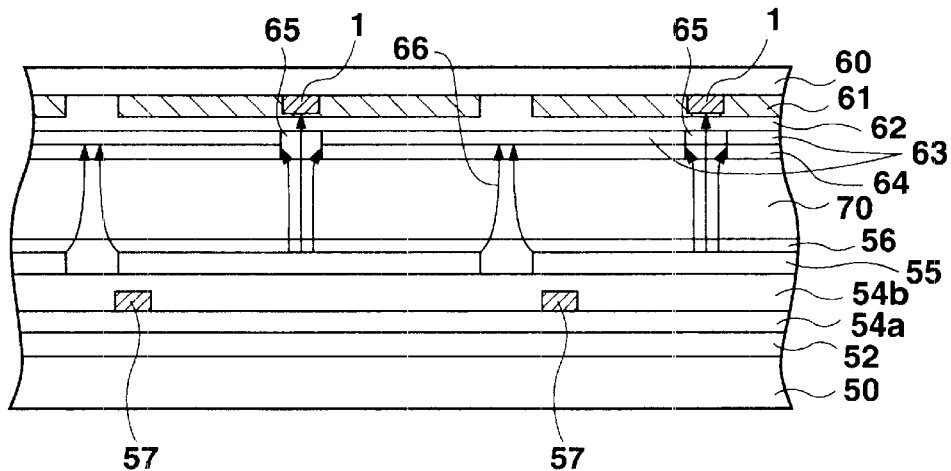

FIG. 1A is a plan view showing a first preferred embodiment of the present invention. FIG. 1B is a cross sectional view showing the first preferred embodiment. Components similar to those of a conventional LCD are given identical reference numerals and explanation thereof is not repeated here.

A gate line 51 is formed extending in the row direction on the first substrate 50, and a part of the gate line 51 constitutes a gate electrode of an TFT 53. A data line 57, formed extending in the column direction on an interlayer insulating film 54a, is connected via the TFT 53 to a pixel electrode 55, on which an unrubbed vertically aligned film 56 is formed. A second substrate 60, arranged opposing to the first substrate 50, has a color filter 61 formed thereon. On the color filter 61, a common electrode 63 is formed via an insulating film 62, as well as an unrubbed vertically aligned film 64. An alignment control window 65 is formed on the common electrode 63, for controlling the alignment direction of the liquid crystal. Liquid crystal 70 having negative dielectric constant anisotropy is enclosed between the first and second substrates 50, 60, and alignment thereof is controlled according to the strength of an electric field formed by a voltage applied to the pixel electrode 55 and the common electrode 63.

A significant difference of the above arrangement from a conventional one is provision of an alignment control assistance electrode 1 between the second substrate 60 and the color filter 61. The alignment control assistance electrode 1 is formed covering the area with the alignment control window 65, i.e., vertically positioned in accordance with the alignment control window 65. The alignment control assistance electrode 1 has a shape resembling a "Y" and an inverted "Y" connected together, which is also connected to a connection section 1c, the connection section 1c continuously extending in the row direction. The alignment control assistance electrode 1 may comprise either metal, such as chrome, or a transparent material, such as an ITO, though metal is more preferred as a transparent electrode generally has higher resistance, compared to metal. In addition, a transparent electrode may have a risk such as light leakage from a pixel for black display when a certain voltage is supplied between the pixel electrode and the alignment control assistance electrode. A metal electrode 1 is free from those problems.

In this description, it is assumed that a voltage higher than that to be applied to the common electrode 63 is supplied to a pixel electrode 55, and that an electric field line is thus formed directing from the pixel electrode 55 toward the common electrode 63, as indicated by the arrow in the drawing. Application of a voltage lower than that to be applied to the common electrode 63, to the alignment control assistance electrode 1 under the above condition causes a vertical electric field directing from the common electrode 63 toward the alignment control assistance electrode 1, as shown by the arrow in the drawing.

On the contrary, when a voltage lower than that to be applied to the common electrode 63 is applied to the pixel electrode 55, a voltage higher than that to the common electrode 63 is applied to the alignment control assistance electrode 1.

That is, a voltage inverted from that to be applied to a pixel electrode 55 is applied to an alignment control assistance electrode 1, using a voltage to be applied to the common electrode as a middle voltage value.

In any case, application of a voltage either higher or lower than that to a common electrode 63 causes a strong vertical electric field in an area with an alignment control window 65 due to an alignment control assistance electrode 1. Accordingly, liquid crystal with negative dielectric constant anisotropy is forced to have a vertical alignment with respect to the caused electric field, i.e., in the direction parallel to the substrates.

As described above, when a vertical electric field is caused in a part immediately below the alignment control window 65 by the alignment control assistance electrode 1, the liquid crystal molecules in that part can be more strongly controlled, compared to a conventional structure without such an electric field caused below the alignment control window 65. The stronger the control of liquid crystal molecule alignment, the shorter time (a response time) needed for the liquid crystal molecules to transit from the initial alignment to in a driven state. Moreover, should the liquid crystal molecules corresponding to the alignment control window 65 be inclined in an unintended direction due to outside disturbance, the alignment of liquid crystals of adjacent pixels is unlikely to affect the alignment of the liquid crystal molecules within the pixel as the alignment of the liquid crystal molecules around the edges of the alignment control window 65 is strongly controlled. This contributes to improved LCD display quality.

Also, a charged glass substrate hardly affects liquid crystal via the alignment control window because charges induced by the charged glass substrate will not remain therein due to a voltage applied to the alignment control assistance electrode 1, covering the alignment control window.

Figure 2A:
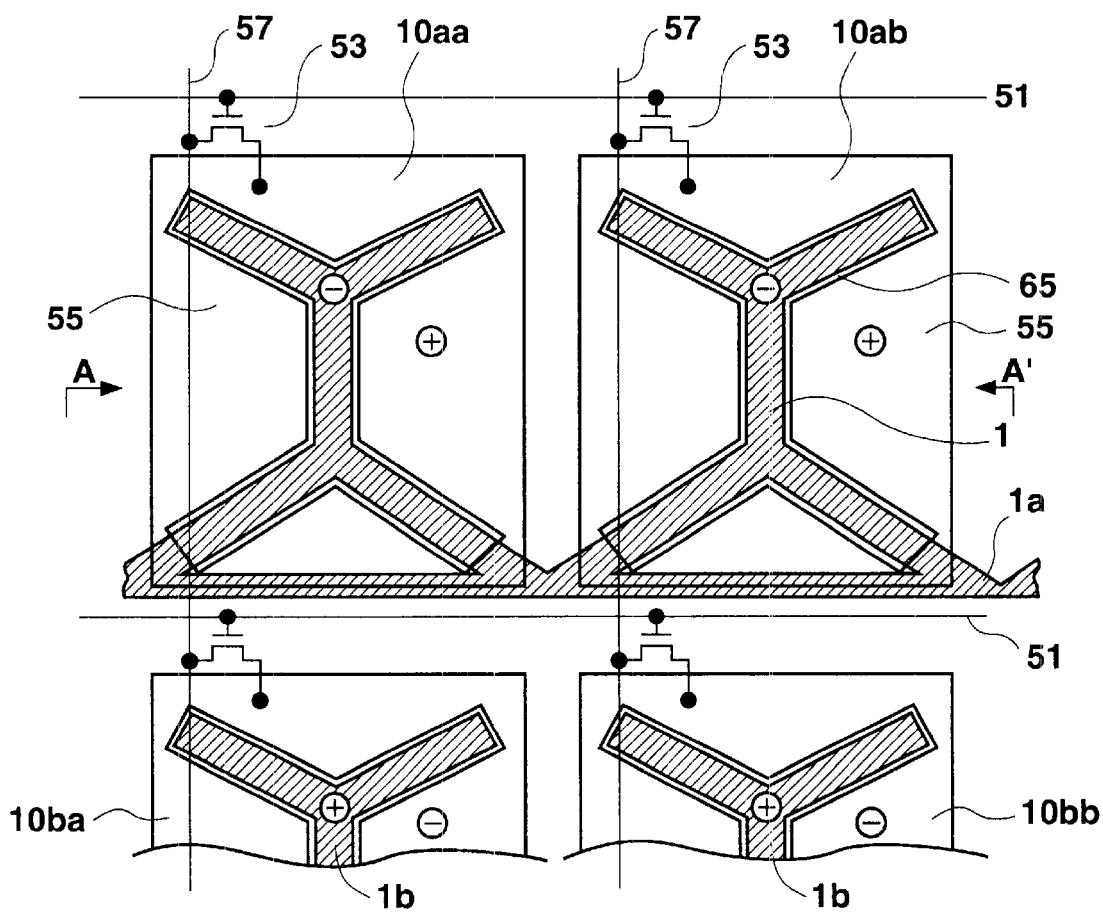
FIGS. 2A and 2B are respectively a plan view showing the preferred embodiment of the present invention.
Figure 2B:
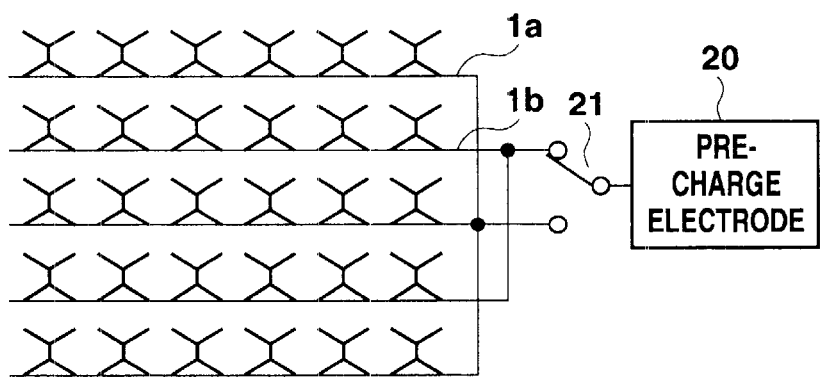

FIG. 2A is a plan view explaining operation of the present invention. FIG. 2B is a plan view schematically showing alignment control assistance electrodes. In this embodiment, a line inversion method is employed for voltage application. Here it is assumed that a higher voltage $V_{high}$, compared to that to be applied to the common electrode 61, is applied to the pixel electrode 10aa, as shown in FIG. 2A. Note that "+" in the drawing represents an electrode with $V_{high}$ applied. Because of the line inversion, the pixel electrode 10ab, arrayed in the same row of the pixel electrode 10aa, is also supplied with $V_{high}$, while pixel electrodes 10ba, 10bb, arrayed in a row adjacent to the row of the pixel electrode 10aa, are supplied with a voltage $V_{low}$ lower than that to be applied to the common electrode 61. An alignment control assistant electrode 1 is supplied with a voltage inverted from that which is supplied to the pixel electrode which that alignment control assistant electrode 1 opposes (or an opposing pixel electrode). Accordingly, a lower voltage $V_{low}$ is applied to the alignment control assistance electrodes 1a, formed on the pixel electrodes 10aa, 10ab, while a higher voltage $V_{high}$ is applied to the alignment control assistance electrodes 1b, formed on the pixel electrodes 10ba, 10bb.

Here, in order to improve voltage response of each pixel electrode when applied with a voltage from a data line, higher or lower voltage $V_{high}$ or $V_{low}$ is supplied to the data lines immediately before the voltage application to the pixel electrodes from the data lines. This is referred to as "precharge". For precharging, a precharge electrode is provided to which a voltage is applied as AC having amplitudes from $V_{high}$ to $V_{low}$.

As shown in FIG. 2B, alignment control assistance electrodes are connected to each other in every other row. That is, alignment control assistance electrodes 1a in odd rows are connected to one another, while alignment control assistance electrodes 1b in even rows are connected to one another. The alignment control assistance electrodes 1a and 1b in odd rows and even rows are respectively in contact with the first substrate at the end of the screen (not shown) so that either the alignment control assistance electrodes 1a or 1b are alternatively connected via the switch 21 to the precharge electrode 20, which is formed on the first substrate.

Note that the precharge electrode 20 alternatingly receives positive ($V_{high}$) or negative ($V_{low}$) voltage depending on the row for display (the row corresponding to one of the data line which is high level).

Alignment control assistance electrodes 1 are supplied with a voltage when a voltage is applied to the pixel electrodes in the row adjacent to the opposing pixel electrodes. This will be described in detail below.

While a positive ($V_{high}$) voltage is applied to pixel electrodes in an odd row, i.e., those opposite to the alignment control assistance electrodes 1a, the precharge electrode 20 is supplied with a positive ($V_{high}$) voltage. At this time, alignment control assistance electrodes 1b in an even row are connected to the precharge electrode 20, and thus supplied with a positive ($V_{high}$) voltage. Subsequently, when a negative ($V_{low}$) voltage is applied to the pixel electrodes in an even row, i.e., those opposite to the alignment control assistance electrodes 1b, the precharge electrode 20 is applied with negative ($V_{low}$) voltage. At this time, the switch 21 is switched so as to connect the alignment control assistance electrodes 1a in the odd row to the precharge electrode 20 for application of a negative ($V_{low}$) voltage thereto. These processes will be there after repeated for voltage application. In this manner, in each pixel electrode row, pixel electrodes and opposing alignment control assistance electrodes are supplied with voltages inverted from each other.

That is, the employment of a line inversion method for voltage application enables application of a voltage $V_{high}$ or $V_{low}$ to every other row. As the alignment control assistance electrodes 1 are connected for every other row, voltage application thereto can be readily achieved. Moreover, as the voltage application is achieved using a line inversion method, voltage application to the alignment control assistance electrodes together with the voltage application to the pixel electrodes in an adjacent row can ensure application of a voltage inverted from that to be applied to the opposing pixel electrode, to the alignment control assistance electrodes.

As described above, the employment of a line inversion method allows, using a precharge electrode 20 for precharging the pixel electrodes, alignment control assistance electrodes to be supplied with a voltage inverted from that to be applied to the opposing pixel electrodes, though a voltage application method is not limited thereto. For example, a precharge voltage may be inverted before being supplied to the alignment control assistance electrodes in a display row (a row of the pixel electrodes which are connected to the data line). Alternatively, a field inversion method can attain substantially the same advantage, in which pixel electrodes in the same row are applied with a voltage with the same polarity during one vertical synchronous period, and then applied with an inverted voltage during the next vertical synchronous period. As another alternative, a dedicated voltage may be generated for alignment control assistance electrode control.

Figure 3A:
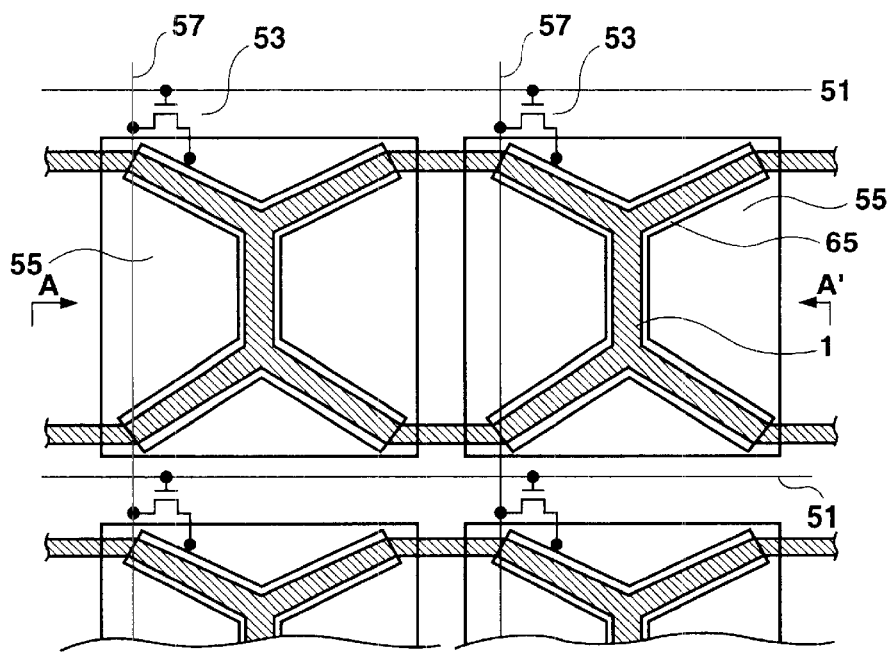
FIGS. 3A and 3B are plan views showing another preferred embodiments of the present invention.
Figure 3B:
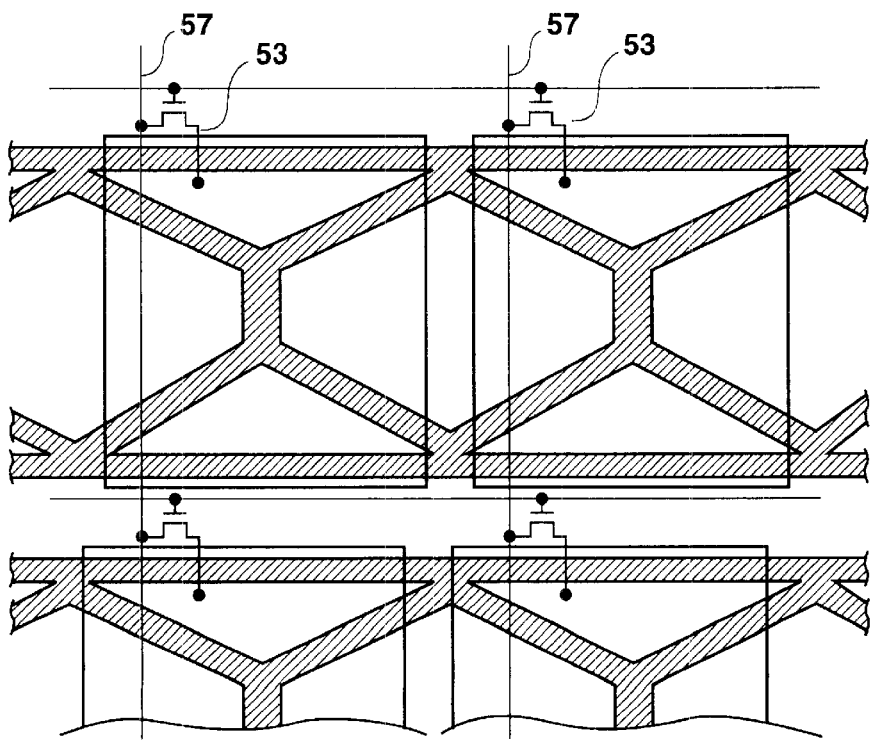

Here, a connection portion 1a, to which the ends of alignment control assistance electrodes 1 in the same row are connected, will be unnecessary when the ends of an alignment control assistance electrodes 1 opposed to a pixel electrode are connected to one another, though provision of the connection portion 1a is effective to reduce electrical resistance of the alignment control assistance electrodes 1. Provision of a connection portion 1c on both sides of the pixels, as shown in FIG. 3B, can further reduce the electrical resistance, though enough space for the provision on both sides can hardly be ensured as other components, such as gate lines 51 and TFTs 53, are closely formed between pixels. In addition, an area with a metal alignment control assistance electrode 1 constitutes a shielding area, and the aperture ratio is therefore decreased. From this point of view, a smaller area for an alignment control assistance electrode 1 is preferred.

In the above example, an alignment control assistance electrode 1 is provided between the second substrate 60 and the color filter 61. As the important feature with this arrangement is insulation of the alignment control assistance electrode 1 from the common electrode 63, a thicker insulation film 62 may be formed. Alternatively, in the case of an LCD without a color filter 61, another insulation film may be provided in the place of a color filter 61. This arrangement, however, may cause attenuation of light transmitting through the insulating film, and the transmittance is accordingly lowered. Drop of transmittance can be avoided through employment of a color filter 61, which is generally an insulating film, to insulate the alignment control assistance electrode 1 and the common electrode 63.

Figure 4A:
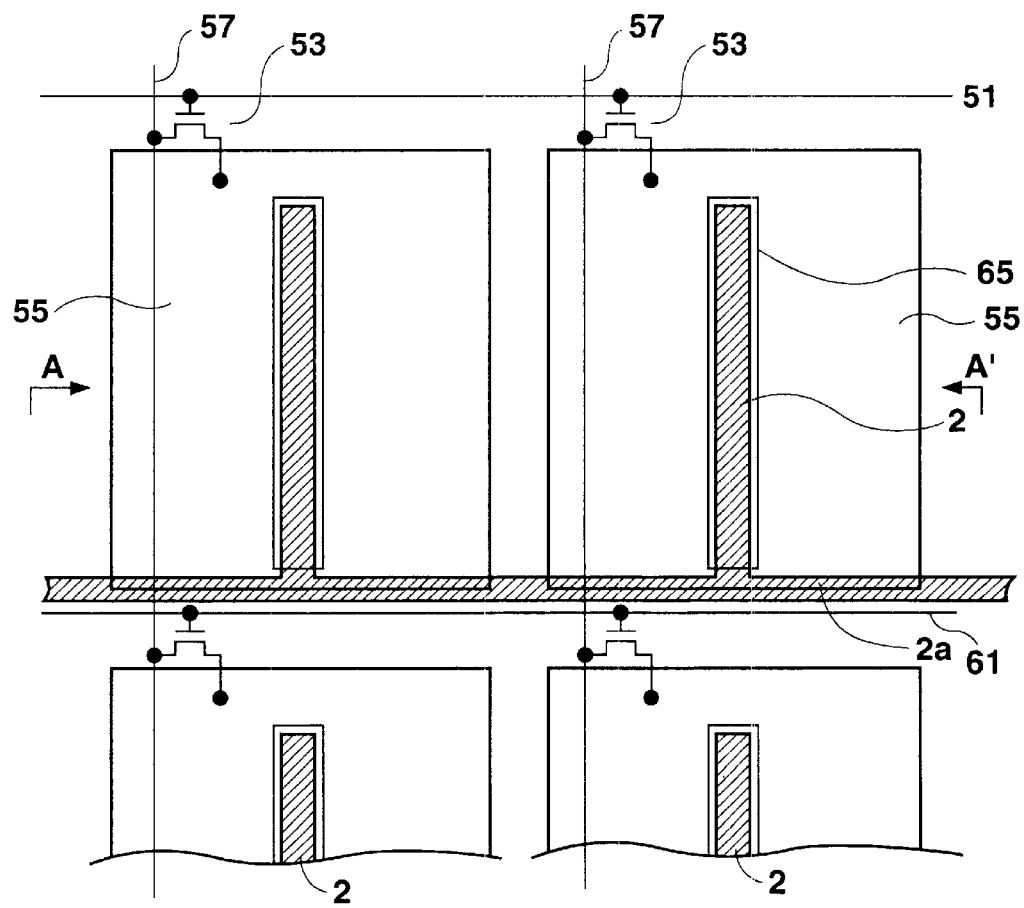
FIGS. 4A and 4B are respectively a plan view and a cross sectional view showing another preferred embodiment of the present invention.
Figure 4B:
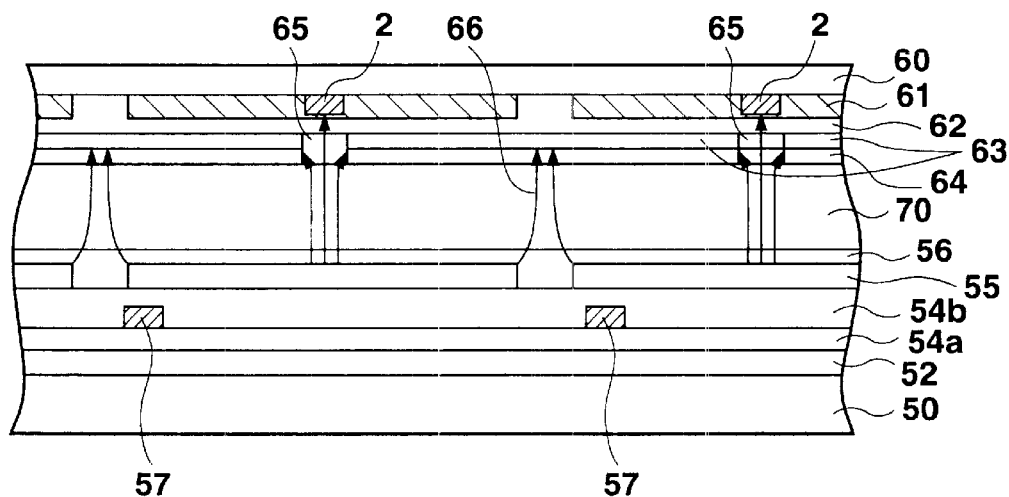

FIG. 4A is a plan view showing a second preferred embodiment of the present invention. FIG. 4B is a cross sectional view showing the second preferred embodiment. A difference of this embodiment from the first embodiment is the straight shape of an alignment control window 65 and the accordingly modified shape of an alignment control assistance electrode 2. The alignment control assistance electrode 2 is formed covering the alignment control window 65, and connected to adjacent ones in the row direction via the connection section 2a. Other structures are identical to those in the first embodiment, and the explanation is not repeated here.

It should be noted that an alignment control window 65 having a shape other than those described in the first and second embodiments may be possible, and the shape of alignment control assistance electrodes can also be varied. The subject matter of the present invention is provision of an alignment control assistance electrode so as to cover an area with an alignment control window, as is obvious also from the embodiment below.

Figure 5A:
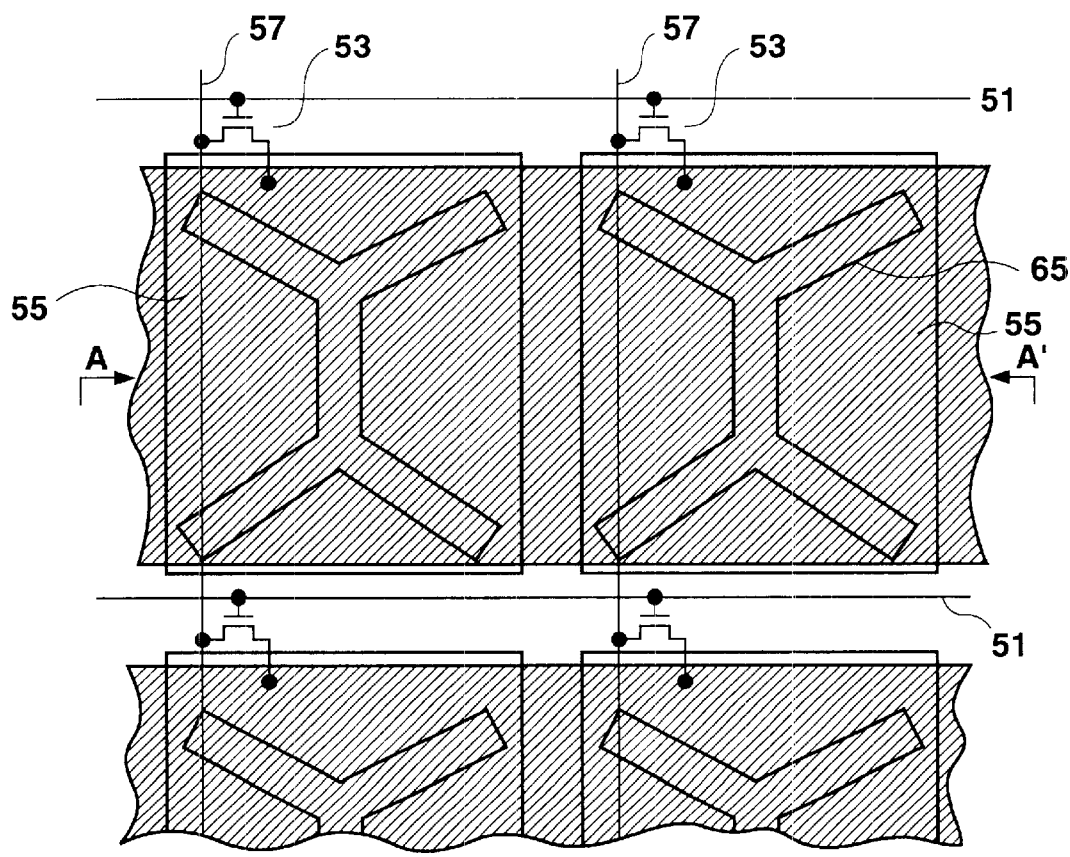
FIGS. 5A and 5B are respectively a plan view and a cross sectional view showing another preferred embodiment of the present invention.
Figure 5B:
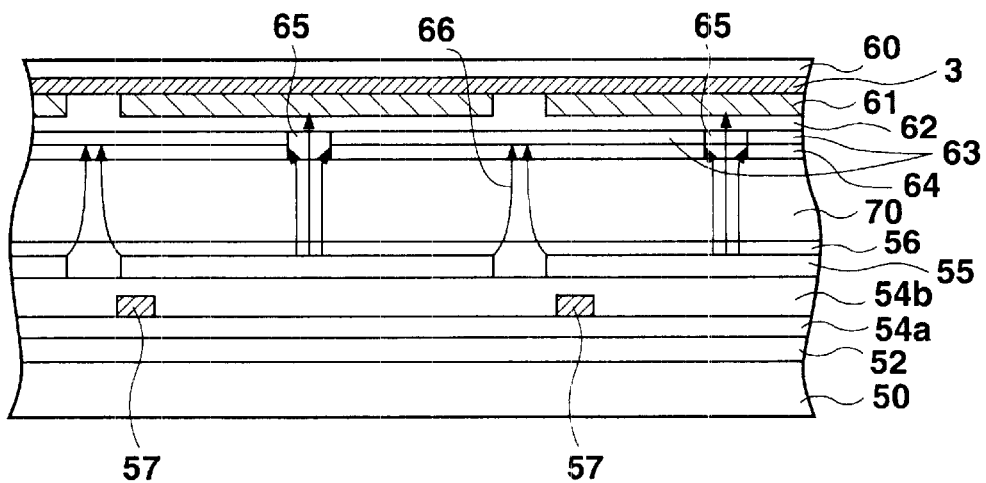
Figure 6A:
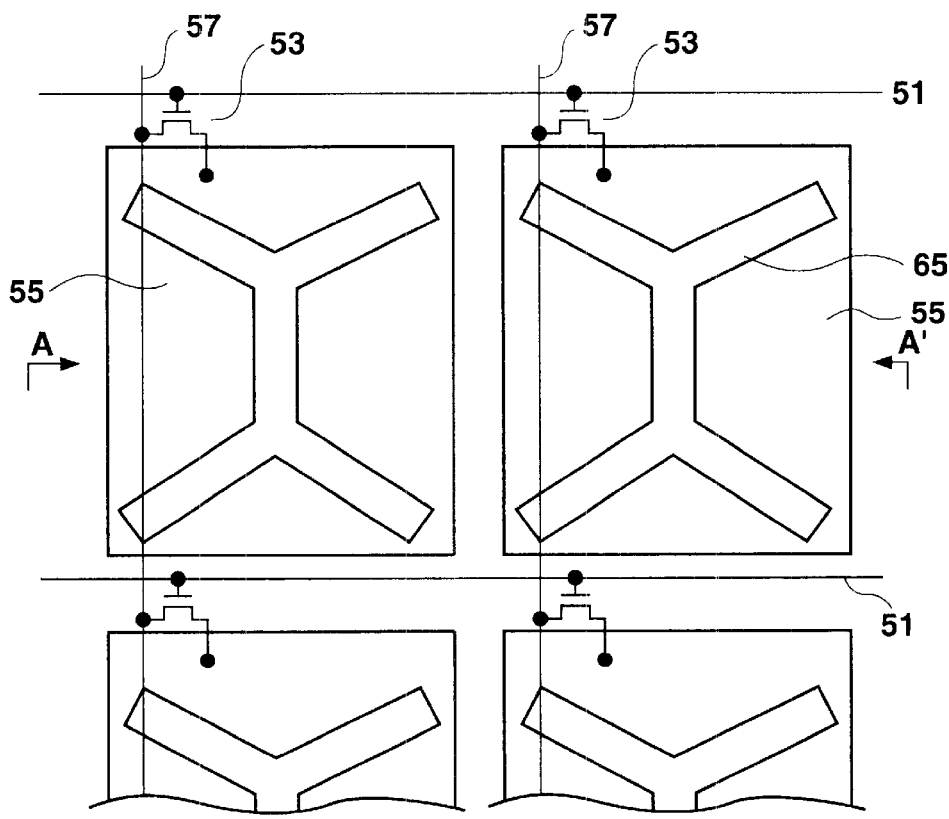
FIGS. 6A and 6B are respectively a plan view and a cross sectional view showing a conventional LCD.
Figure 6B:
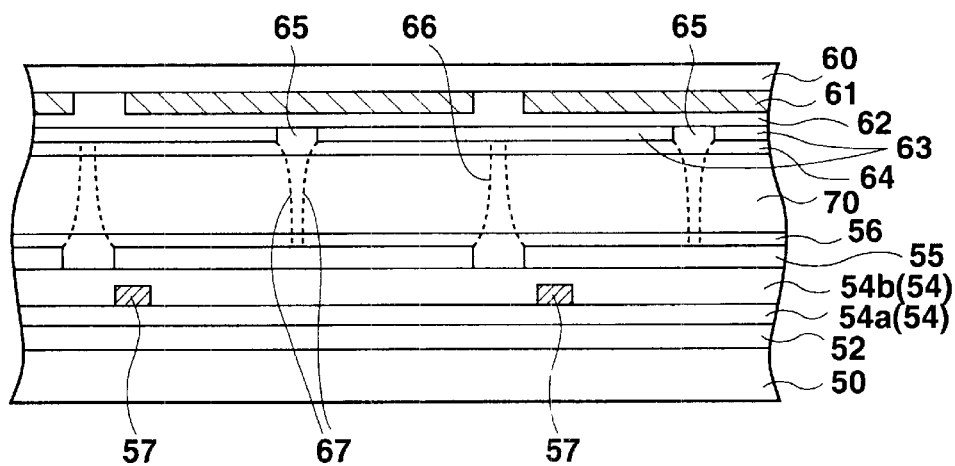
Figure 7:
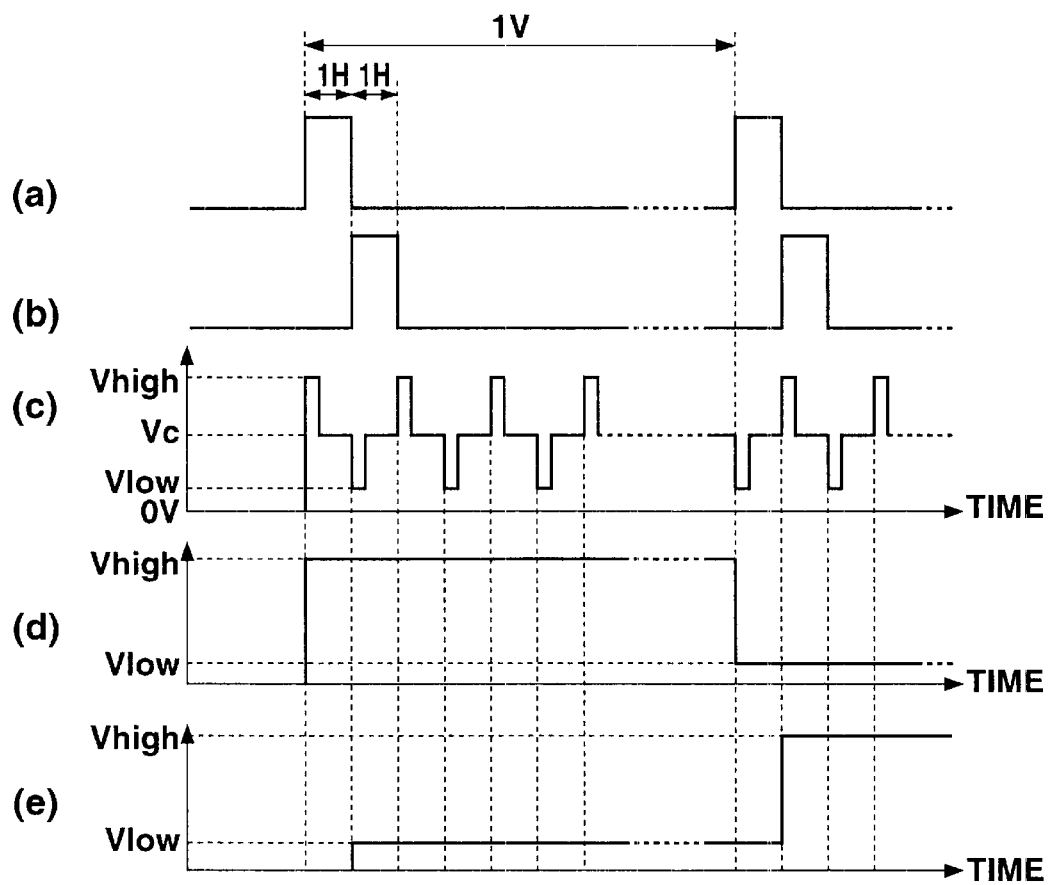
FIG. 7 is a timing chart for voltage application according to line inverted system.

FIG. 5A is a plan view showing a third preferred embodiment of the present invention. FIG. 5B is a cross sectional view showing the third preferred embodiment. A difference of this embodiment from the first embodiment is that an alignment control assistance electrode 3 is a transparent electrode comprising ITO or the like and fully covering the pixel electrodes in the row direction. As it is transparent, an alignment control assistance electrode 3 does not block screen display though it fully covers the pixels. Also, as it is continuous in the row direction, the alignment control assistance electrodes 3 appears like a stripe for each pixel row, as shown in the drawing. However, due to a larger area with overlapping alignment control assistance electrode 3 and electrode 64, a large parasitic capacitance is caused, deteriorating a response speed with respect to an applied voltage in this embodiment. In this view, an alignment control assistance electrode 3 and a common electrode 64 are desired to be placed as far apart as possible. The distance can be ensured through provision of a thicker insulating film 62, which, however, may cause a drop in transmittance. In order to address this problem, in this embodiment, the alignment control assistance electrode 3 is formed between the second substrate 60 and the color filter 61 so that the distance can be ensured utilizing the thickness of the color filter 61.

What is claimed is:

1. A liquid crystal display device, comprising:
    a first substrate on which a plurality of pixel electrodes are formed in a matrix;

a second substrate, placed opposite to the first substrate, on which a common electrode opposing to the plurality of pixel electrodes is formed;

a liquid crystal material, which is enclosed between the first substrate and the second substrate, having negative dielectric constant anisotropy; and alignment control assistance electrodes provided between the common electrode and the second substrate; wherein the common electrode has alignment control windows formed by opening holes thereon in areas opposite to pixel electrodes; and the alignment control assistance electrodes are supplied with a voltage having a polarity inverted from a voltage to be applied to the plurality of pixel electrodes using a voltage to be applied to the common electrode as a middle voltage value.

2. A device according to claim 1, further comprising an insulating film provided between the alignment control assistance electrodes and the common electrode, wherein the alignment control assistance electrodes are vertically positioned in accordance with the alignment control windows.

3. A device according to claim 2, wherein the alignment control assistance electrodes each have substantially the same shape of corresponding alignment control window.

4. A device according to claim 2, wherein the insulating film, provided between the alignment control assistance electrodes and the common electrode, is at least partly a color film capable of transmitting predetermined colored light.

5. A device according to claim 1, wherein the alignment control assistance electrodes are transparent electrodes formed for covering an entire area corresponding to the plurality of pixel electrodes.

6. A device according to claim 1, wherein the alignment control assistance electrodes are connected in a row direction, and supplied with a same voltage value.

7. A device according to claim 6, wherein the liquid crystal display device is driven by a line inversion method, in which polarity of an applied voltage is inverted for every row, and the alignment control assistance electrodes are supplied with a voltage when a voltage is supplied to pixel electrodes in a row adjacent to the pixel electrode that the alignment control assistance electrodes are opposite to.

8. A device according to claim 7, further comprising a precharge electrode which is connected to data lines for supplying a voltage to the plurality of pixel electrodes in respective rows, for advance charging voltage to the plurality of the pixel electrodes before application of a display voltage to the data lines, wherein the alignment control assistance electrodes are supplied with a voltage by the precharge electrode.

9. A liquid crystal display device, comprising:

a first substrate on which a plurality of pixel electrodes are formed in a matrix;

a second substrate, placed opposite to the first substrate, on which a common electrode opposing to the plurality of pixel electrodes is formed;

a liquid crystal material which, is enclosed between the first substrate and the second substrate, having negative dielectric constant anisotropy;

alignment control assistance electrodes provided between the common electrode and the second substrate;

an insulating film provided between the alignment control assistance electrodes and the common electrode, wherein the common electrode has alignment control windows formed by opening holes thereon in areas opposite to pixel electrodes, the alignment control assistance electrodes are formed for covering the alignment control windows, the alignment control assistance electrodes each have substantially the same shape of corresponding alignment control window, and the alignment control assistance electrodes are supplied with a voltage having a polarity inverted from a voltage to be applied to the plurality of pixel electrodes using a voltage to be applied to the common electrode as a middle voltage value.

10. A device according to claim 9, wherein the alignment control assistance electrodes are connected in a row direction, and supplied with a same voltage value.

11. A device according to claim 10, wherein the liquid crystal display device is driven by a line inversion method, in which polarity of an applied voltage is inverted for every row, and the alignment control assistance electrodes are supplied with a voltage when a voltage is supplied to pixel electrodes in a row adjacent to the pixel electrodes that the alignment control assistance electrodes are opposite to.

12. A device according to claim 11, further comprising a precharge electrode, which is connected to data lines for supplying a voltage to the plurality of pixel electrodes in respective rows, for advance charging voltage to the plurality of the pixel electrodes before application of a display voltage to the data lines, wherein the alignment control assistance electrodes are supplied with a voltage by the precharge electrodes.

13. A liquid crystal display device, comprising:

a first substrate on which a plurality of pixel electrodes are formed in a matrix;

a second substrate, placed opposite to the first substrate, on which a common electrode opposing to the plurality of pixel electrodes is formed;

a liquid crystal material which is enclosed between the first substrate and the second substrate, having negative dielectric constant anisotropy;

alignment control assistance electrodes provided between the common electrode and the second substrate;

an insulating film provided between the alignment control assistance electrodes and the common electrode, wherein the common electrode has alignment control windows formed by opening holes thereon in areas opposite to pixel electrodes, the alignment control assistance electrodes are formed for covering the alignment control windows, the alignment control assistance electrodes are transparent electrodes formed for covering an entire area corresponding to the plurality of pixel electrodes, and the alignment control assistance electrodes are supplied with a voltage having a polarity inverted from a voltage to be applied to the plurality of pixel electrodes using a voltage to be applied to the common electrode as a middle voltage value.

14. A device according to claim 13, wherein the alignment control assistance electrodes are connected in a row direction, and supplied with a same voltage value.

15. A device according to claim 14, wherein the liquid crystal display device is driven by a line inversion method, in which polarity of an applied voltage is inverted for every row, and the alignment control assistance electrodes are supplied with a voltage when a voltage is supplied to pixel electrodes in a row adjacent to the pixel electrodes that the alignment control assistance electrodes are opposite to.

16. A device according to claim 15, further comprising a precharge electrode, which is connected to data lines for supplying a voltage to the plurality of pixel electrodes in respective rows, for advance charging voltage to the plurality of the pixel electrodes before application of a display voltage to the data lines, wherein the alignment control assistance electrodes are supplied with a voltage by the precharge electrode.

17. A liquid crystal display device, comprising:
a first substrate on which a plurality of pixel electrodes are formed in a matrix;
a second substrate, placed opposite to the first substrate, on which a common electrode opposing to the plurality of pixel electrodes is formed;
a liquid crystal material, which is enclosed between the first substrate and the second substrate, having negative dielectric constant anisotropy; and
alignment control assistance electrodes provided between the common electrode and the second substrate; wherein
the common electrode has alignment control windows formed by opening holes thereon in areas opposite to pixel electrodes;
the alignment control assistance electrodes are connected in a row direction, and supplied with a same voltage value; and
the alignment control assistance electrodes are supplied with a voltage having a polarity inverted from a voltage to be applied to the plurality of pixel electrodes using a voltage to be applied to the common electrode as a middle voltage value.

18. A device according to claim 17, further comprising a precharge electrode, which is connected to data lines for supplying a voltage to the plurality of pixel electrodes in respective rows, for advance charging voltage to the plurality of the pixel electrodes before application of a display voltage to the data lines, wherein the alignment control assistance electrodes are supplied with a voltage by the precharge electrode.

19. A liquid crystal display device, comprising:
a first substrate on which a plurality of pixel electrodes are formed in a matrix;
a second substrate, placed opposite to the first substrate, on which a common electrode opposing to the plurality of pixel electrodes is formed;
a liquid crystal material which is enclosed between the first substrate and the second substrate, having negative dielectric constant anisotropy; and
alignment control assistance electrodes provided between the common electrode and the second substrate;
an insulating film provided between the alignment control assistance electrodes and the common electrode; wherein
the common electrode has alignment control windows formed by opening holes thereon in areas opposite to pixel electrodes;
the alignment control assistance electrodes are vertically positioned in accordance with the alignment control windows;
the insulating film, which is provided between the alignment control assistance electrodes and the common electrode, is at least partly a color film capable of transmitting predetermined colored light; and
the alignment control assistance electrodes are supplied with a voltage having a polarity inverted from a voltage to be applied to the plurality of pixel electrodes using a voltage to be applied to the common electrodes as a middle voltage value.

20. A device according to claim 19, wherein the alignment control assistance electrodes are connected in a row direction, and supplied with a same voltage value.

21. A device according to claim 20, wherein the liquid crystal display device is driven by a line inversion method, in which polarity of an applied voltage is inverted for every row, and the alignment control assistance electrodes are supplied with a voltage when a voltage is supplied to pixel electrodes in a row adjacent to the pixel electrodes that the alignment control assistance electrodes are opposite to.

22. A device according to claim 21, further comprising a precharge electrode, which is connected to data lines for supplying a voltage to the plurality of pixel electrodes in respective rows, for advance charging voltage to the plurality of the pixel electrodes before application of a display voltage to the data lines, wherein the alignment control assistance electrodes are supplied with a voltage by the precharge electrode.

* * * * *